United States Patent Office 3,064,732
Patented Nov. 20, 1962

1

3,064,732
METHOD FOR INCREASING FORMATION PERMEABILITY
George G. Bernard and Orrin C. Holbrook, Crystal Lake, Ill., assignors to The Pure Oil Company, Chicago, Ill., a corporation of Ohio
No Drawing. Filed Nov. 16, 1959, Ser. No. 852,963
2 Claims. (Cl. 166—44)

This invention relates to a method for improving the input rates of water-injection wells in oil fields. This invention is more particularly concerned with a method for chemically treating the water-accepting formation surrounding a water-injection well or brine-disposal well to increase the rate at which water will enter the formation under a given pressure head.

The use of water injection in secondary recovery of petroleum is widespread. In such secondary recovery operations, it is necessary that large volumes of water be injected into the oil-bearing formation at reasonable pressure heads. In the primary production of oil, it is sometimes necessary to dispose of large quantities of brine produced with the oil. In disposing of such brine by injection into a subterranean formation, it is again necessary that the input well handle large volumes of fluid at reasonable pressures.

Mechanical clean-out, acid treatment, and solvents have been used with varying degrees of success for increasing the input of water or brine into the formation. The first two of these methods are generally effective, but the labor and cost involved and the loss of input time on the well while it is being serviced, make these methods expensive. Solvents and water-soluble wetting agents have, in general, proven ineffective, or at best only slightly effective.

It is an object of this invention to provide an improved method for increasing the water permeability in that portion of a subterranean formation immediately surrounding a water-injection well, and thereby increase the water-intake capacity of said well.

Briefly, the method of this invention comprises injecting a relatively small volume of methyl alcohol through the water-injection well and into the formation. The injection of water or brine is then commenced or resumed.

When a water-injection well is first drilled through an oil-bearing formation preparatory to initiating water-flooding, the formation around the well-bore has a relatively high oil saturation. As water is injected through the well and formation, the oil saturation around the well-bore gradually diminishes and the permeability to water increases proportionately, until an oil saturation is reached in which oil no longer is displaced and the water permeability becomes constant. Frequently, this water permeability is too low to permit injecting water at the desired rate, that is, the water-intake capacity of the formation is inadequate.

Now, in accordance with this invention, it has been discovered that the water permeability of an oil-bearing formation can be greatly increased by simply passing a small quantity of methanol therethrough. In practicing this invention, it is necessary to treat only the portion of the reservoir immediately surrounding the injection well, since, as is well known, the greatest resistance to water intake occurs within a short distance from the well-bore. Consequently, the amount of material to be injected is related to the pore volume of the reservoir within a radius of about 3 to 10 feet from the well, and it is preferred to use about 0.1 to 10.0 times this pore volume. Larger volumes are not harmful, but needless expense is incurred.

It has further been found that the purity of the alcohol has a very marked effect upon the method of this invention. It is preferred to use substantially anhydrous methanol, that is methanol of technical purity. Aqueous methanol solutions may be used, but the methanol content of the solution should be not less than about 80%.

The method of this invention has been demonstrated by a series of flooding experiments on Berea sandstone cores containing oil and brine. The brine solution comprised 5% NaCl and 0.5% $CaCl_2$. The pore volume of the cores was about 15 cc. The cores were initially flooded with brine until oil production ceased and the permeability to the brine became constant, thereby simulating the conditions immediately surrounding an injection well during water-flood. Then the following procedures were followed:

EXPERIMENT I 1000 cc. of brine were passed through the core. Constant permeability was reached after about 700 cc.

EXPERIMENT II 1000 cc. of brine containing 0.01% of a surfactant (isooctyl phenyl polyethoxy ethanol-mixture of the 9 and 10 ethoxy group compounds) were passed through the core. Constant permeability was reached after about 700 cc. of brine-surfactant had been injected.

EXPERIMENT III 100 cc. of methyl alcohol and then 300 cc. of brine were passed through the core. Constant permeability was reached after about 100 cc. of brine had been injected.

EXPERIMENT IV 100 cc. of a solution comprising 80% methyl alcohol and 20% water, and then 300 cc. of water were passed through the core. Constant permeability was reached after about 100 cc. of water had been injected.

The data obtained in these experiments are listed in Table I. Each core is considered to have a permeability of 1.00 after the preparatory flood with brine. The cores were selected to have approximately the same permeability after the preparatory flood.

TABLE I
EFFECT OF METHYL ALCOHOL ON PERMEABILITY OF CORE TO WATER

| Exp. No. | Initial Oil Saturation (Percent Pore Vol.) | Oil Saturation Aft r Water-flood (Percent Pore Vol.) | Oil Saturation At End Of Treatment (Percent Pore Vol.) | Permeability |||||
|---|---|---|---|---|---|---|---|---|
| | | | | Initial Permeability After Passage Of Floodwater (cc.) Through Core |||||
| | | | | 100 | 300 | 500 | 700 | 1,000 |
| I | 72.5 | 43.1 | 43.1 | 1.00 | 1.00 | 1.02 | 1.06 | 1.06 |
| II | 72.3 | 45.2 | 18.1 | 1.21 | 1.80 | 2.23 | 2.55 | 2.55 |
| III | 71.2 | 36.9 | 32.4 | 6.48 | 6.48 | | | |
| IV | 69.1 | 36.5 | 29.9 | 2.64 | 2.77 | | | |

Particularly noteworthy is the fact that the permeability improvement in Experiment III was practically immediate, while that in Experiment II, where conventional procedure was used, was relatively slow. The data also shows that the permeability improvement in Experiment III was not due to the removal of oil from the core. The residual oil saturation in Experiment II was much lower than in Experiment III, but the permeability improvement was not nearly as great. While the 80% methanol solution of Experiment IV substantially improved the permeability of the core, the improvement was considerably less than that shown for the substantially anhydrous methanol of Experiment III. It will be noted, however, that the 80% methanol solution resulted in an almost immediate improvement in permeability, although the improvement was of lesser magnitude than for pure methanol.

It is evident that this invention provides a method for substantially improving the water-acceptance rates of injection wells by treatment with a relatively small quantity of treating material. The word "water," as used in this specification and the appended claims, is taken to include the various aqueous materials which are suitable for injection into an oil-containing formation in secondary recovery water-flood processes, and further to include aqueous solutions which may conveniently be disposed of by injection into a subterranean formation.

As a specific example of the method of this invention, it is decided to treat a water-injection well penetrating an oil-containing formation 50 feet thick to increase the water input-rate of the well. The injection of water is temporarily discontinued, 2,000 gallons of 95% methanol is injected through the well and into the formation, and the injection of water is resumed. The water input-rate is found to be increased by a factor of about five.

The embodiments of the invention in which an exclusive property or privilege is claimed are defined as follows:

1. A method of increasing the water permeability of a subterranean formation surrounding a water-injection well comprising the steps of injecting through said well and into said formation a liquid consisting of not less than 80% methanol by volume, the remainder being water, the amount of said liquid injected being 0.1 to 10 times the pore volume of the formation zone extending for a radius of about 3 to 10 feet around the well, and thereafter injecting water through said well and into said formation.

2. The method in accordance with claim 1 in which said liquid is substantially anhydrous methanol.

References Cited in the file of this patent

UNITED STATES PATENTS

| | | |
|---|---|---|
| 2,258,000 | Chamberlain | Oct. 7, 1941 |
| 2,262,428 | Lietz | Nov. 11, 1941 |
| 2,808,109 | Kirk | Oct. 1, 1957 |
| 2,830,018 | Thompson et al. | Apr. 8, 1958 |

FOREIGN PATENTS

| | | |
|---|---|---|
| 696,524 | Great Britain | Sept. 2, 1953 |

OTHER REFERENCES

Producer's Monthly, article by Slobod, "A Review of Methods Used to Increase Oil Recovery," Feb., 1958, page 31.